US008306833B2

(12) United States Patent
Hurpin

(10) Patent No.: US 8,306,833 B2
(45) Date of Patent: Nov. 6, 2012

(54) COLLECTIVE TRANSPORTATION SYSTEM AND PROCESS

(76) Inventor: Patrick Hurpin, Paris (FR)

( * ) Notice: Subject to any disclaimer, the term of this patent is extended or adjusted under 35 U.S.C. 154(b) by 731 days.

(21) Appl. No.: 12/281,016

(22) PCT Filed: Mar. 2, 2007

(86) PCT No.: PCT/FR2007/000371
§ 371 (c)(1),
(2), (4) Date: Nov. 12, 2008

(87) PCT Pub. No.: WO2007/099234
PCT Pub. Date: Sep. 7, 2007

(65) Prior Publication Data
US 2009/0313095 A1    Dec. 17, 2009

(30) Foreign Application Priority Data

Mar. 2, 2006   (FR) ..................................... 06 01848

(51) Int. Cl.
*G06Q 10/00*    (2012.01)
(52) U.S. Cl. ............................................. 705/5; 705/13
(58) Field of Classification Search ................. 705/5, 13
See application file for complete search history.

(56) References Cited

U.S. PATENT DOCUMENTS

| | | | |
|---|---|---|---|
| 3,587,878 A | | 6/1971 | Strandberg et al. |
| 5,066,187 A | * | 11/1991 | Hammer ...................... 414/237 |
| 6,431,078 B2 | * | 8/2002 | Serrano ........................... 104/91 |
| 7,381,022 B1 | * | 6/2008 | King .............................. 414/267 |
| 2007/0031218 A1 | * | 2/2007 | Haag ............................. 414/227 |

FOREIGN PATENT DOCUMENTS

| | | |
|---|---|---|
| CH | 668 324 A5 | 12/1988 |
| EP | 0 985 574 A2 | 3/2000 |
| EP | 0 991 031 A2 | 4/2000 |
| GB | 2 405 634 A | 3/2005 |
| NL | 1 009 447 C2 | 12/1999 |
| WO | 98/27295 A1 | 6/1998 |

* cited by examiner

*Primary Examiner* — Shannon Campbell
(74) *Attorney, Agent, or Firm* — Panitch Schwarze Belisario & Nadel LLP

(57) ABSTRACT

A system is provided for the collective transport of people using a plurality of vehicles within a urban territory equipped with parking structures near transfer stations. Each parking structure comprises boxes for parking available vehicles in rows that provide a handling platform comprising a return area in front of a first row and a pick-up area in front of a second row. A mechanism displaces the boxes and brings, at the level of the handling platform, an empty box and an occupied box. The vehicle is thereafter advanced from the occupied box onto the pick-up area and taken therefrom. The vehicle is thereafter brought to the return area of a second parking structure, advanced and introduced in the empty box thereof. The empty box thereafter containing the vehicle is raised by the mechanism and replaced by a second empty box ready to receive a further vehicle.

15 Claims, 5 Drawing Sheets

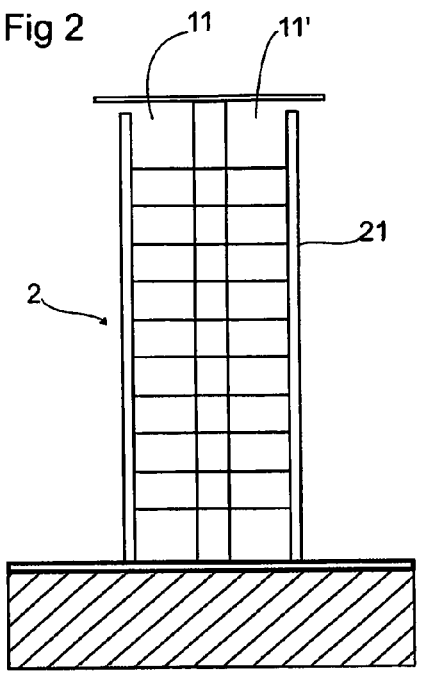
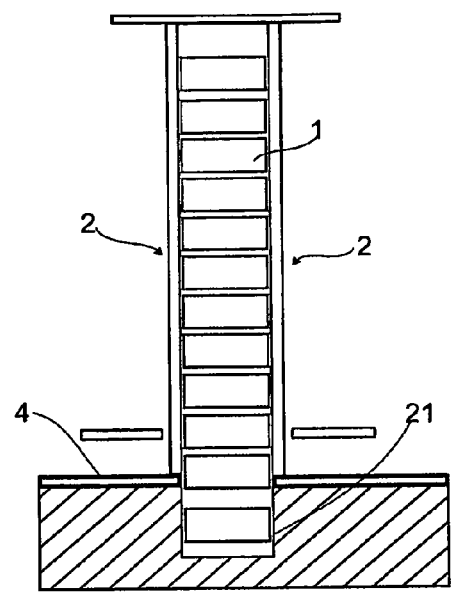
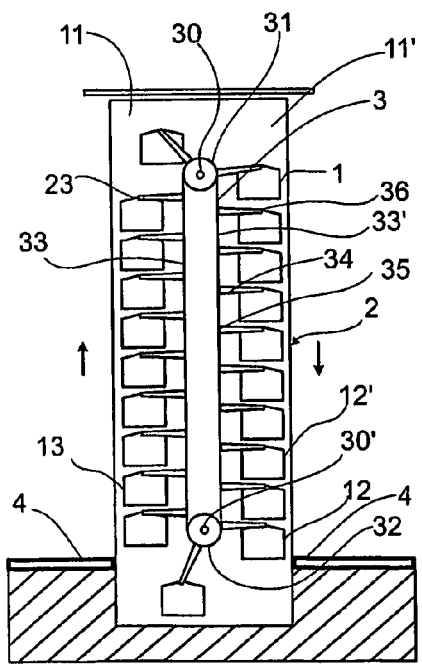
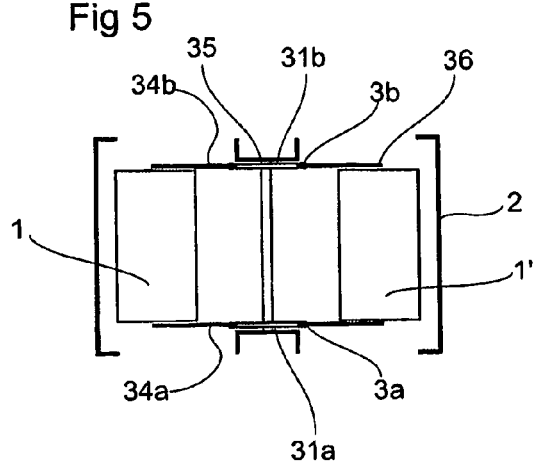

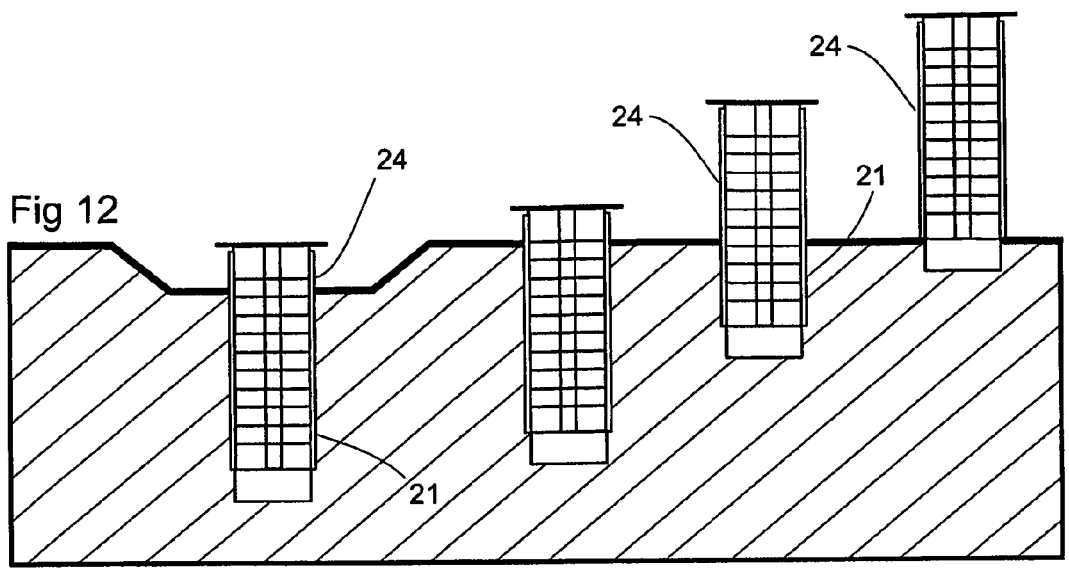
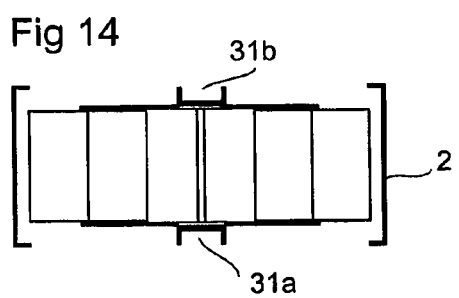
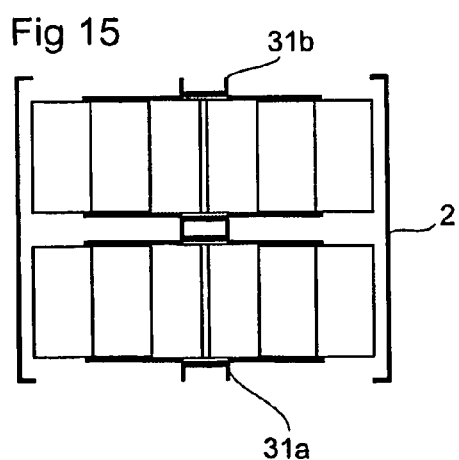
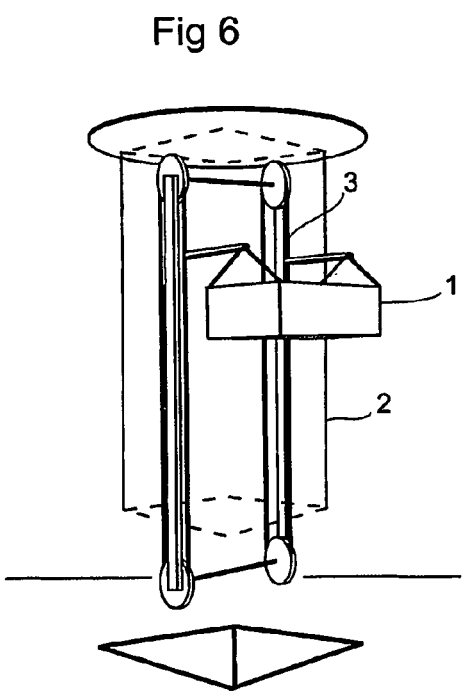

COLLECTIVE TRANSPORTATION SYSTEM AND PROCESS

CROSS-REFERENCE TO RELATED APPLICATION

This application is a Section 371 of International Application No. PCT/FR2007/000371, filed Mar. 2, 2007, which was published in the French language on Sep. 7, 2007 under International Publication No. WO 2007/099234 A1, and the disclosure of which is incorporated herein by reference.

BACKGROUND OF THE INVENTION

The object of the invention is a system and process for the individual and collective transportation of people within a defined territory, particularly intended for urban sites, by means of a fleet of autonomous vehicles put to the disposition of a given population, so as to complement a public transport network.

At the present time, dense urban zones are becoming increasingly polluted and congested by the circulation of individual vehicles. Public transport systems have been developed to remedy this problem.

However, bus services that use the normal street system still remain a source of pollution and are slow moving because, even with access to reserved bus lanes, they are subject to obstructions by individual vehicles, at least at street intersections, so that their average speed remains relatively low.

Underground transport systems, such as subways, are a slight source of pollution and their speed is good However, even though dense subway systems could be built in some cities at the beginning of the $20^{th}$ century, their expansion is very costly and can be made only on certain lines or using existing railway lines.

Moreover, urban sprawl has created longer distances for people to travel between their homes and their workplaces.

To facilitate access to urban centers, regional transportation systems have been created most often using existing rail lines, but these lines are organized, typically, in a star configuration from the city center so that rarely are there peripheral connections between outlying townships or suburban districts.

Thus, using a private vehicle remains a necessary means of transportation for a lot of people, at least to access a regional transportation network and car parks must be built, resulting in a high expenditure for municipalities because of the extensive amount of land required to accommodate the numbers of parked cars.

Even if multistoried car parks are created, they require access ramps and circulation aisles on each storey, so that the necessary space for each parked vehicle requires 25 m2. Thus multistoried car parks can occupy a significant amount of space and, if realized at ground level, are too costly to remain profitable, considering the land cost in urban districts.

In certain cities, where ground conditions can permit, the public domain may be used to create underground parking structures, but the number of such car parks remains insufficient and the cost excessive.

Furthermore, private automobiles used in this way remain stationary on the ground most of the time.

In any event, considering the increase in automobile traffic and the resulting increase in pollution, it has been necessary to search for new solutions that can be as drastic as limiting the circulation of private vehicles or reducing their use by introducing a toll system within urban centers.

For commuters coming from greater distances, large parking areas can be built on the city's periphery adjacent to a public transit station which then provides access to the city center. Meanwhile, public transportation networks are rarely dense enough and often require people to walk long distances to attain their final destination.

Even if a circle line is created betweens urban communities around the city center, the possibilities of public transportation are always limited and very costly to realize. Thus the dependency on private vehicles remains a necessity in many cases.

Other options include taxis, but they can be burdensome particularly outside of city centers as there are few of them so they can be difficult to find.

Another possibility, if one wants to avoid using a private vehicle, is to rent a car from a car rental agency, for instance in proximity to a train station or airport, and to return the rented car eventually to another agency. Such a system is rather costly and may be useful only for long displacements between distant cities and for periods of one day or more.

To facilitate the transport of people within a limited territory without having to use private vehicles, systems of shared vehicles have been proposed.

Document EP-A-0991031, for example, describes such a shared system that allows for the displacement of individuals between different destinations within an amusement park. This kind of park obviously prohibits the use of private vehicles and the use of a shuttle system would permit transit between attractions but requires long waits each time. Thus, this document proposes a shared system of independent vehicles distributed amongst parking lots located in proximity to a hotel and to different attractions within the park with multiple vehicles available at each site. Each visitor procures a transport title linked to a control system that allows access to the parking lot, authorizing the person to withdraw a vehicle to use as transportation to an attraction where the vehicle can be parked, and where it may be, in turn, used by another visitor. In this way, rather than having the visitor rent a vehicle for the duration of his/her stay in the park, where the vehicle remains stationary at each attraction during each visit, a vehicle that is parked at an attraction can be immediately taken by another visitor leaving the said attraction. The number of vehicles in service and the size of each parking lot can be calculated in function of the number of visitors and the duration of each attraction such that each visitor can find a vehicle at his/her disposition upon exiting the attraction.

The inventor had the idea to create a whole system for the storage and sharing of vehicles in order to facilitate vehicular circulation in urban areas, where it would be possible to make use of a fleet of autonomous vehicles as a complement to a public transportation network, in such a way that the users, being assured of having a vehicle at their disposition at any time, would relinquish the use of their personal car within the urban center or, if they are coming from outside the city, would accept to park their cars at the city periphery, and then use the proposed collective transport.

The inventor then realized that, to this aim, a number of conditions needed to be met.

To begin with, studies undertaken in public transportation have shown that the majority of users will not accept displacement by foot unless it is over short distances. For example, in a city like Paris (or other similar large cities) that benefits from a dense public transportation network, where connections have been created between local transit lines or with regional transportation networks, it appeared that users have difficulty accepting a transfer time by foot that exceeds 4 to 5 minutes, or 300 to 500 meters maximum (unless a rolling sidewalk is made available).

To complement the public transportation network with a system of shared vehicles, it would be necessary for the parking garages containing the vehicles to be sited in immediate proximity to a connecting station.

This implies the realization of a large number of parking garages distributed throughout a urban territory where open land is scarce and very costly.

Moreover, each user would want to find a free vehicle immediately and, taking into account the number of users concerned, which would be far greater than the number of users at an amusement park, each garage would have to contain a large number of vehicles, 15 to 20 or more to be practical, depending on the public transit station it serves.

At the same time, each user returning a vehicle would want to do so very quickly in order to transfer onto the public transit system in the shortest time possible for the transfer.

BRIEF SUMMARY OF THE PRESENT INVENTION

Therefore the object of the invention is to create a new process of individual and collective transport using shared vehicles that resolves all the above mentioned problems.

According to the invention, the region that it serves being an urban district equipped with a public transportation network with multiple station stops and transfer stations located at the confluence of different lines, parking structures are to be situated at a short distance, accessible by foot in several minutes from at least certain transfer stations of the network, these structures being of a vertical displacement type allowing for the storage of at least ten or more autonomous vehicles on a minimal ground surface area, each parking structure consisting of at least one entrance space which can be immediately accessed by returning vehicles, and an exit space occupied by a waiting vehicle that can be made immediately available to the user, the said autonomous vehicles constituting, for the user, a complement to the public transit system allowing for, at any time, a user to take charge of a vehicle at the exit of a transit station of the network, use it for an individual journey, and return it to an open space at the entrance to a parking structure situated in immediate proximity to a transfer station to continue his/her journey by public transit system.

To that end, according to a preferred means of realization, each automated parking structure is of the "Noria" type, with vertical displacement of storage platforms, along two columns, respectively ascending and descending, in such a way as to permit, on the one hand, the storage of one or more vehicles in entry spaces, with the immediate availability of one or more free spaces for the return of one or more vehicles and, on the other hand, after vehicles have been already picked up by one or more previous users, the immediate availability for one or more users to pick-up one or more newly available vehicles at the exit platform.

The invention thus covers a whole system for the transportation of people in an urban conurbation consisting of:
  at least one public transportation network of individual station stops and transfer stations where transportation lines cross:
  a collection of autonomous vehicles equipped with a locking system that provides both access to and operation of the vehicle put to the disposition of a group of users each of whom is equipped with a personalized transport title that gives the right to operate the said vehicle;
  multiple automated parking structures sited in proximity of certain station stops of the transit network, each parking structure being of a vertical displacement type allowing for the storage of at least ten or more vehicles on a minimal ground space and consisting of, at the ground level, at least one or more empty spaces for the immediate reception of one or more returned vehicles after having been used and one or more spaces containing one or more vehicles available for pick-up by one or more users;
  each user having a need to commute to a destination within the urban conurbation, the urban periphery, or suburban districts, being able to do so by executing one part of the journey by public transit system and the other part by autonomous vehicle with minimal displacement by foot and a short wait time for the pick-up of and return of the vehicle.

As an advantage, the lower part of the parking structure may be buried below the level of the handling zone, in order to reduce the height of the structure above ground.

Another preferred feature is to have electric or dual-energy powered vehicles, where each vehicle storage space is equipped with a means to recharge the batteries of the vehicle during the time that it is stored in the structure.

According to another preferred feature, each transportation title constitutes a means of payment, for it's holder to use the vehicle according to the amount of time the vehicle is used or the distance travelled.

Preferably, these transportation titles each consist of a smart card with a personalized code, programmed to permit the holder, after having entered his/her code, to effectuate all the necessary operations for taking charge of a vehicle, and payment for the use of the vehicle. In addition, a smart card can serve as a pass for the utilization of the public transit system over a certain district and over a certain period of time.

The invention has the added benefit not only of reducing, and potentially even doing away with automobile traffic in the city center. It can also be applied to the whole conurbation including the outlying suburbs that are typically poorly served by public transport system.

According to another particularly advantageous characteristic, in the case of a conurbation comprising a city center surrounded by a ring of suburbs which are served by a regional transportation network, at least a certain number of station stops of the regional transportation network can be equipped with automated parking structures stocked with waiting vehicles, such that a user taking the regional transportation network can, upon exiting a station, immediately take charge of a vehicle to continue his journey independently to his/her final destination and then return the vehicle, either to the parking structure from which the vehicle was taken, or another parking structure in proximity to his/her final destination.

In particular, in the usual case where regional transportation lines are far apart from one another, those districts that are not directly served by public transportation can be equipped with automated parking structures distributed in such a way that they can be easily accessed by foot so that a user can take charge of a vehicle and then either return it to a public transit station equipped with an automated parking structure that can receive the vehicle, or to return the vehicle at another automated parking structure in close proximity to his/her destination.

But the invention also facilitates connections between a large city and smaller peripheral cities separated by a relatively great distance but compatible with the range of the vehicle. Indeed, each peripheral city could be equipped by one or more automated garages, depending on the size of the city, in such a way as to permit a user to access the transportation system of the major city or to access another peripheral city without having to use his/her own private vehicle and paying only for the amount of time taken to execute the journey.

BRIEF DESCRIPTION OF THE DRAWINGS

Other advantageous characteristics of the invention will become apparent in the following description of a transport system adapted for a city, described as a non-limited example, referencing the attached drawings.

FIG. 2 is a frontal view of an automated garage.

FIG. 3 is a side view of an automated garage.

FIG. 4 is a transverse section view of the mechanism for storing the vehicles.

FIG. 5 is a horizontal section view of the mechanism.

FIG. 6 shows, schematically, the functioning of the mechanism in perspective view.

FIG. 12 shows diverse possibilities for site locations of a parking structure.

FIGS. 14 and 15 indicate horizontal sections of two possible realizations.

DETAILED DESCRIPTION OF THE INVENTION

Figure 1:
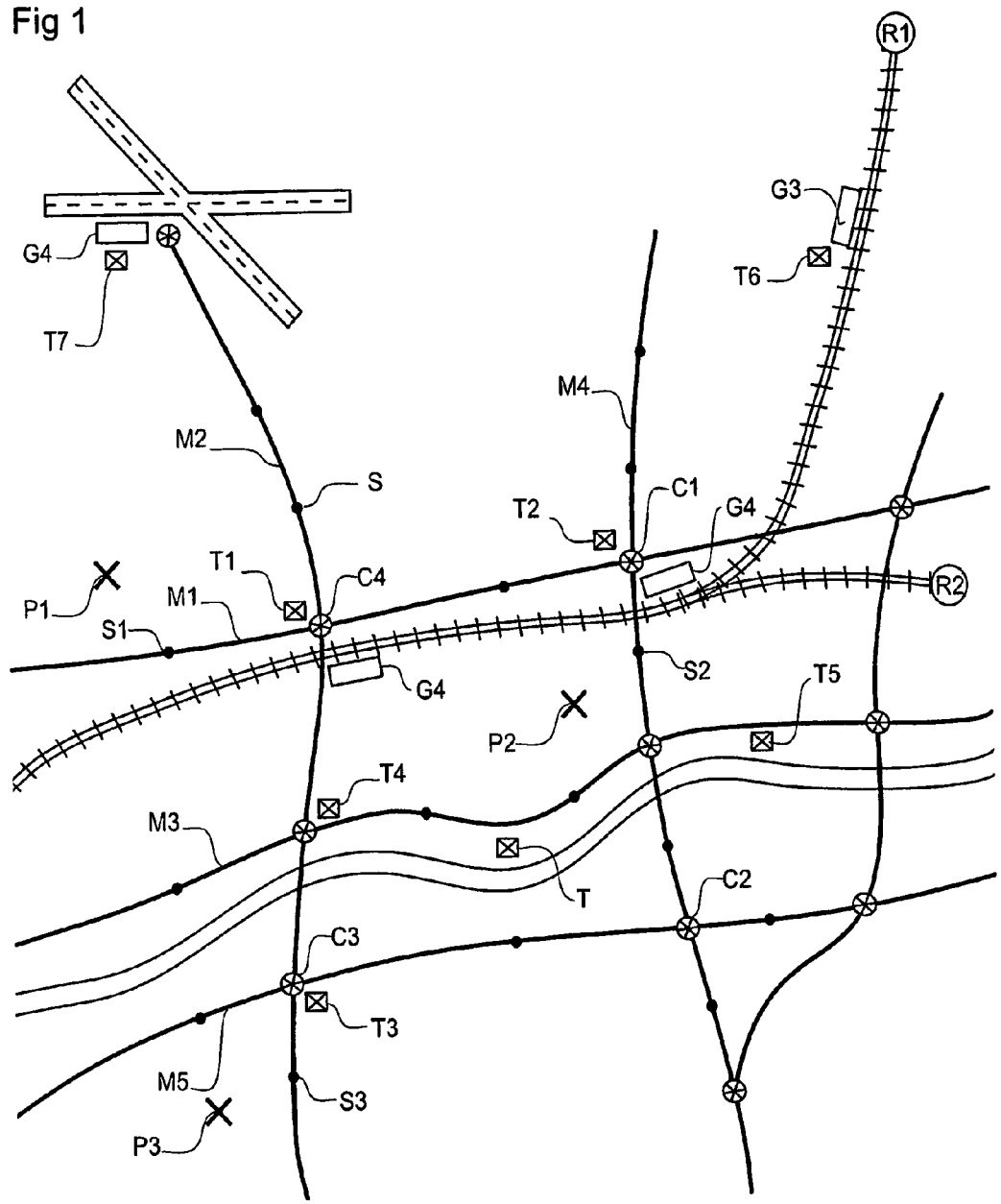
FIG. 1 is a general plan of a town equipped with a transportation system according to the invention.

FIG. 1 schematically shows an example of an urban site equipped with multiple public transportation networks, for example, subway lines or surface lines M1, M2 . . . Mi along which are located station stops S and transfer stations C, as well as commuter rail lines R1, R2 with stations G1, G2.

Thanks to this existing system, a user located at a point P1 and wishing to use public transportation to access a point P2 can go to the closest station S1 to use the line M1, take it to the transfer station C1, then take the line M4 to arrive at the station S2 being the closest stop to point P2. If the user judges the travel time to be too long, he/she can call a taxi to go directly from P1 to P2, but the transportation costs will be higher.

Moreover, the same user, after having arrived at point P2, may, for example, wish to proceed to point P3.

The distance between P2 and P3 being too far to go by foot, the user must get back onto line M4 at station S2, change lines at transfer station C2 to take the line M5, change again at station C3 to take the line M2 and get off at station S3 being closest to his/her destination P3.

A journey such as this is thus quite long and complicated and requires many elementary connections at transfer stations to be made by foot as well as long waiting times.

On the other hand, as will now be demonstrated, the system according to the invention will permit a simpler means of transportation and reduce the travel time while affording the user the use of personal transportation that comes as a complement to public transportation assuring reduced waiting times at transfer points. In this system, the territory is equipped with a certain number of automated parking structures T1, T2 . . . Ti that, preferably, are placed in proximity to the transfer stations of the public transportation network or in other strategic locations and within which are stored a certain number of autonomous vehicles, say 15 to 20 or more.

In this way, a user arriving from P1 by the line M2 could get off at transfer station C1, retrieve a vehicle at parking structure T2 in proximity to C1, journey at will to P2 choosing his/her own itinerary, hold onto the same vehicle to then continue on to his/her second destination P3 and then deposit the vehicle at the automated parking structure T3, get back on the public transit line M2, return to the station S1 by way of line M1, making a correspondence at transfer station C4.

However, to the extent that each journey is individual, carried out by means of vehicles made available to anyone, the user has the choice between multiple solutions. For example, he/she can get off the M1 line at the first station C4, pick-up a vehicle at the nearest parking structure T1, and then freely choose his/her own itinerary to pass by points P2 and P3, and eventually return to garage T1 to return the vehicle and get back on to the same line M1 from which the user came.

Thus, the system, according to the invention, offers a great amount of flexibility for the user for a more moderate cost than a taxi or a standard car rental to the extent that it can be made available to a large number of people who have bought an access card, provided that a very large number of vehicles are stocked in numerous parking structures distributed throughout the territory, preferably in proximity to a mass transit system or other strategic points in the city such as train stations, commercial zones, hospitals, universities, or multimodal transit platforms.

As we have already indicated, in order to reduce the circulation of private vehicles, the autonomous vehicles made available to users need to constitute a veritable complement to the mass transit system and the automated parking structures that are distributed over the whole region must permit one to quickly pick-up and return a vehicle, in such a way that the total amount of time involved in making a transfer only takes a few minutes.

To this aim, it would be particularly advantageous that the automated parking structures used are of the "Noria" type, represented schematically in FIGS. 2 to 6.

This type of parking structure consists of, in a general sense, an ensemble of super-imposed boxes or storage platforms 1 forming two parallel rows 11, 11' being inside a building 2 in the form of a tower in which a mechanism 3, represented schematically in FIG. 4, can put the boxes 1 in motion.

This mechanism consists of a chain-drive 3 held in tension by two sprocket wheels 31,32 positioned respectively at the top and bottom of the tower 2 and put in rotational motion around horizontal axis 30, 30' by a motor (not represented).

The chain drive 3 thus consists of two parallel vertical parts, respectively an ascending part 33 and a descending part 33' upon which are attached arms 34 held perpendicular to the chain 3 by embedding means 35.

Each box 1 is fixed by its upper side to the free extremity 36 of an arm 34 by means of an articulated joint allowing for a pendular suspension.

In this way, as is shown in FIG. 4, along the two vertical parts 33 and 33' of the chain 3, the arms 34 extend horizontally and the boxes 1 are superimposed along two parallel vertical rows 11 and 11'. When the sprocket wheels 31 and 32 are put into rotating motion, the boxes of row 11 move vertically towards the top, and the boxes of row 11' move vertically towards the bottom. While passing around sprocket wheels 31 and 32 the arms 34 remain radially oriented as they turn around axis 30 and 30', while the boxes remain level because they are suspended in a pendant manner.

The vehicles stored on platforms 1 can be distributed in such a way as to maintain an equilibrium between the ascending row 11 and the descending row 11'.

In this way, the tower 2 can be conceived as a lightweight framework, preferably metallic.

As shown in FIGS. 5 and 6, the chain drive 3 is made up of two branches 3a and 3b, each platform 1 being suspended on a pair of arms 34a and 34b that rotate about two spaced sprocket wheels 31a and 31b at the upper and lower levels.

The base 21 of the tower is sunk into the ground over a sufficient height to assure the stability and a handling platform 4 is provided either set directly at grade, as indicated in FIG. 4, or at an intermediate level.

Figure 7:
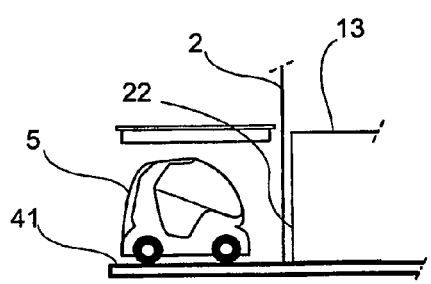
FIGS. 7 and 8 schematically show, respectively from the side and from above, the storage after use of a returned vehicle in the parking structure.
Figure 8:
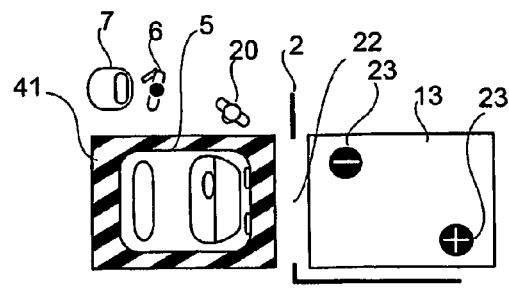

In this way, when sprocket wheels 31 and 32 are set in motion engaging the movement of the chain drive 3, either a box 12 of the descending row 11' or a box 13 of the ascending row 11 can be brought to the level of the handling platform 4. In FIGS. 7 and 8, we have represented schematically the process for depositing a vehicle 5 being returned after use.

A return lane 41 with a roof cover is located on the platform 4 at the foot of the tower 2, leading to an access door 22 that opens at the base of the tower 2's structure.

After having parked his/her vehicle in the return lane 41, the driver registers his/her return in a card reader 7 and a service agent 20 assigned to the parking structure 2 takes charge of the vehicle 5 to insert it into an empty storage box 13 that has been brought to the level of the working platform 4 by the displacement of the chain drive 3.

Preferably the vehicle 5 is propelled by electricity or by dual-energy and each storage box 1 is equipped with an electrical recharge post 23 wired to a power source.

Figure 9:
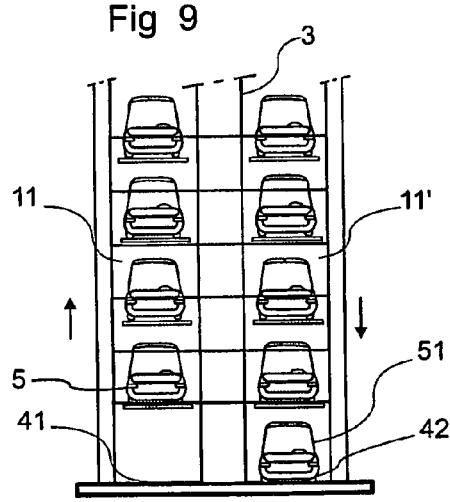
FIG. 9 is a partial view, in elevation, of a parking structure with stored vehicles.

As is shown in FIG. 9, the vehicle 5 then gradually rises inside the parking structure as a result of the displacement of the chain drive 3, either because a vehicle 51 has been withdrawn by a new client and then replaced by a new vehicle 52, or because a vehicle has been returned to the arrival area of the parking structure and stored in the entrance box 12.

Each vehicle thus moves progressively from the ascending row 11 to the descending row 11' and remains stored in the tower 2 over a period of time that allows for battery recharge.

The number of vehicles reserved in each tower can be adapted to the expected frequency of utilization in order to assure the necessary time needed to recharge the batteries.

As we have previously indicated, the use of a parking structure of the Noria type, with an ascending column 11 and a descending column 11', would permit the storage of a large number of vehicles 5 within a surface area that is determined by the two columns and the space needed between them.

Furthermore, compared to a standard multi-level parking structure, an automated parking structure with vertical displacement of vehicles does not require an access ramp and no floor plates, the distance between each level being determined by the height of the vehicle, since the user will not have access to the interior of the structure.

It is thus possible, as is shown in FIGS. 2 through 5, to park 15 to 20 vehicles or more on a surface area that is three to four times smaller than the surface area required for a traditional parking structure; in fact, the number of vehicles parked will only depend on the height of the structure and the surface area available at grade.

In practice, while a standard multi-level parking structure occupies a surface area of 25 square meters per vehicle, a Noria type parking structure with two columns, built within a tower having a height of 30 meters, occupies a width and depth of ten meters, representing a minimal surface at grade, say 3 to 5 m per stored vehicle.

The use of this type of garage would thus permit, given the reduced surface area at grade that it occupies, to realize, even in city centers, a fairly large number of automated parking structures containing a large number of vehicles, for example 15 to 30 or more, so that, at any time, a user exiting a public transit station can find an available vehicle.

Furthermore, the incremental vertical displacement of the boxes containing the vehicles permits, after a returned vehicle has been stored into a box, to immediately have it replaced by an empty box 12 and, after a user withdraws a vehicle 51, to have it immediately replaced by a new unassigned vehicle at the exit space 13.

In this way, Noria type parking structures answer all the conditions required for a vehicle to be made available to its user thus constituting a veritable complement to the public transport network, each user being assured of being able to procure or return an autonomous vehicle in proximity to a transit station, with a displacement by foot and a waiting time that is of the same order as the transfer time required between to transit lines.

It is to be noted that, in this respect, due to the large number of vehicles put to the disposition of the users and the frequency of their utilization that may be expected, considering that the vehicles come as a complement to public transportation, it would be cost-effective to assign an agent to each parking structure to supervise the operations for the pick-up and drop-off of vehicles and, to make the process even quicker, a completely automated system without any agent will be considered.

Figure 10:
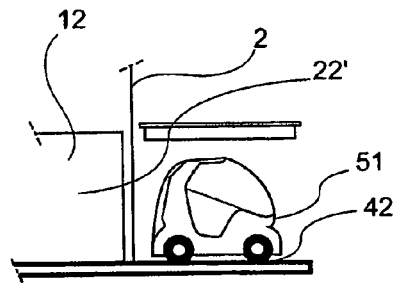
FIGS. 10 and 11 schematically show, in side view and from above, a user taking charge of a vehicle.
Figure 11:
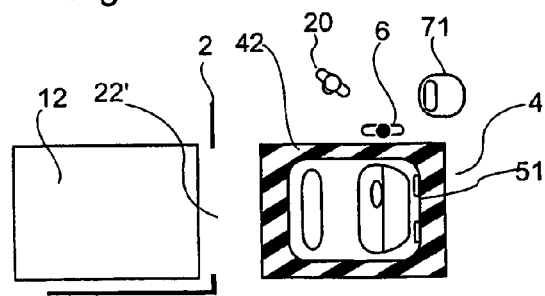

FIGS. 10 and 11 show schematically vehicle pick-up by a new user who first presents his/her transport title to a card reader 71 located at the parking structure exit 22' so that the client is recognized.

A service agent 20, or automated system, advances a vehicle 51 which has been previously placed at the level of the handling platform 4, to position it on the pick-up zone 42.

If necessary the agent makes any necessary verifications and the user can then start the vehicle 51 to undertake his/her own itinerary before returning the vehicle, either in the same parking structure or on other one located in another part of the city.

As indicated above, the same personalized transportation title can simultaneously constitute authorization to access any parking structure for the pick-up or drop-off of a vehicle, a means to control locking-unlocking of the vehicle, the start-up of any one of the vehicles, and a means of payment for the use of the vehicle depending on the duration or, eventually, the distance travelled.

As a further advantage this transportation title can be constituted as a smart card with a secret code, permitting the carrier of the card, after logging in his/her code, to carry out all the necessary operations needed for taking charge of a vehicle and for the payment of its use.

The smart card permits access to the handling platform if it is a secured area and for its carrier to be recognized by presenting it at entry terminal 7 or exit 71 of the parking structure.

Figure 13:
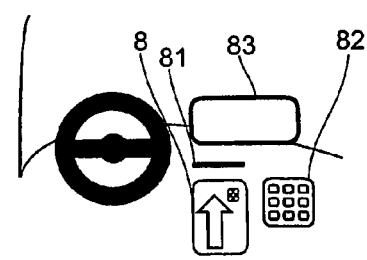
FIG. 13 illustrates schematically the payment system.

As shown on FIG. 13, the conductor can insert the smart card 8 in a reader 81 and enter his/her code on a keyboard 82 to unlock a vehicle and start it up.

The counter 83 starts up once the vehicle is set in motion or once the card in inserted in the card reader at exit terminal 71 and stops upon return once the card is inserted in the entry terminal 7.

To facilitate the usage of vehicles as a complement to public transit, the smart card purchased by the user can also constitute a pass for the utilization of the network over a certain zone of the urban district and over a determined duration. The cell phone of each client linked to the internet could permit each user to obtain a personal code authorizing the reservation and start-up of the vehicles.

Thanks to the storage of the vehicles into two well balanced stacked rows, the parking structure can be constituted as a fairly lightweight structure that is relatively inexpensive and that occupies a limited amount of space.

It is to be noted, moreover, that during normal service, no person has access into the parking structure, so that no floor plates are required and the ventilation systems can be simplified.

As is shown in FIG. 12, such a structure can be sunken into the ground to various levels, for example by means of boring techniques used for the construction of bridge pylons.

Depending on the location of the parking structure in the city, and, of course, the nature of the ground conditions, one could vary the relative heights of the buried section 21 and of the superstructure 24.

Such an advantage would again facilitate the placement of a fairly large number of parking structures even in the city center.

Of course the invention is not limited to the details of the embodiment which has been described only as one example, but covers, to the contrary, all variants using, for example, equivalent means.

In the case, for example, where one can foresee a heavy use of the system, it would be possible to realize parking structures of greater dimensions, for example, a system of double platforms as represented schematically in FIG. 14, which allows for the storage of 40 or more vehicles in a space of 15 to 16 meters wide or a system of four platforms juxtaposed as represented in FIG. 15 which allows for the storage of 80 vehicles or more occupying a space of 15 meters in width and depth.

Moreover, it is preferable to use electric or dual-energy propelled vehicles to help reduce pollution in cities due to gas emissions but the system is also applicable to standard gas propulsion vehicles since the displacement of vehicles within an automatic parking structure does not require the engine of the vehicle to be running.

Also, it is particularly advantageous to use identical vehicles or compact vehicles to keep the dimensions of the parking structure at a minimum but it could be also possible to use different types of vehicles having dimensional characteristics compatible with those of the parking structure.

To facilitate utilization by a large number of users and to encourage them to avoid using their personal vehicles, it would also be possible to provide certain choices between different types of vehicles provided that they take up little space, for example a vehicle for two people with a large baggage space, or a vehicle for four people, or a pick-up type vehicle, allowing for easy loading of baggage or other objects.

Different types of vehicles can also be distributed along columns 11, 11' of the parking structure, in such a way so that the user's choice of vehicle can be brought to the exit lane through the control of the assigned agent or by an adaptation to the automated system.

On another note, the user is able to travel long distances, for example between the city center and the suburbs or between satellite cities around a metropolis, because the journey is completely autonomous and billed according to the length of time the vehicle is used.

Thus a parking structure T6 could be placed in proximity to a station G3 of a regional transport line R1. A parking structure T7 could be also placed in proximity to an airport G4 at a relatively great distance from the city.

However, where land values do not justify the construction of an automated parking structure, it is also possible to put to the disposition of the users a certain number of vehicles, being of the same type as those placed in the parking structures located in the city, in a surface lot, since any of these vehicles can be unlocked and driven by means of a transportation title, a smart card, or by an internet connection providing a personalized access code.

In this case, for a user arriving by plane, it would be possible to pick up an autonomous vehicle at the parking structure T7, in proximity to the airport G4 to move about freely as he/she wishes, then return the vehicle to a parking structure T6 to then be able to take the line R1 of the regional transportation network.

Figure 16:
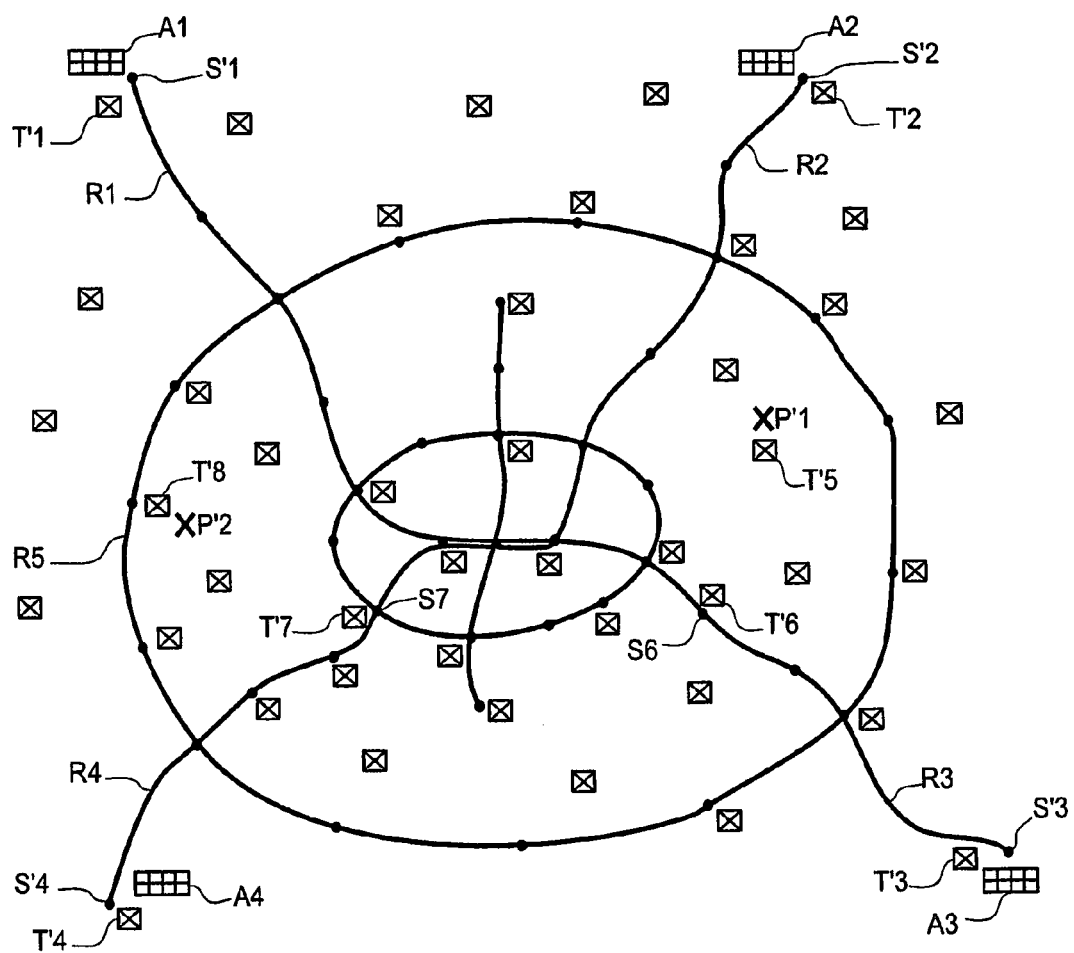
FIG. 16 illustrates the application of the invention to a major city surrounded by suburbs or new cities.

Also, as is shown schematically in FIG. 16, the minimal floor area needed at grade for the parking structures allows for the construction of a large number of parking structures distributed around the center of the urban district.

In FIG. 16, for example, we have represented multiple regional transport lines R1, R2, R3, R4 and an inter-suburban transit line R5. A large capacity parking lot A1, A2 . . . is provided at the terminus of each line, permitting the users coming from far away to park their personal vehicle, as well as an automated garage of autonomous vehicles T'1, T'2 . . . with a large capacity adapted to the foreseeable frequency of use expected at the terminus.

In this way, a user coming from a distant city can leave his/her personal vehicle at the parking lot A1 and either take the transport line R1 to go towards the city center, or take an autonomous vehicle in the parking structure T'1 to go to any place in the suburbs where he/she will find another parking structure T'5 where the vehicle can be deposited, being assured that for the return journey, he/she can rapidly obtain another autonomous vehicle to return to the parking lot A1.

Also, a person living in the suburbs, for example in P'1, and wishing to travel to another suburb, for example P'2, could take out a vehicle in garage T'5 in proximity to his/her residence, go to a public transport station S6, leaving the vehicle at parking structure T'6 situated nearby, take public transport to station S7, take another vehicle from parking structure T7 located nearby, and return the vehicle to parking structure T'8 near to his/her destination.

It can be seen that there are multiple possibilities that leaves the user the choice of his/her mode of transportation knowing that the transfer times are reduced if a sufficient number of automated parking structures are distributed across the territory.

Thus, where correspondences between regional transportation lines are usually only assured in the center of an urban district, the shared system, according to the invention, in complement to the public transportation network, will permit one to get off the first line R1 at a station equipped with a parking structure, to take an autonomous vehicle, to connect with another line R4 at a station equipped with a parking structure and return the vehicle to take the line R4, the correspondence having been effectuated without having to pass through the city center.

What is claimed is:

1. A system for the collective transport of people using a plurality of available individual vehicles without using private vehicles, within a urban territory comprising:

a public transportation network having multiple lines along which are located a plurality of station stops and a plurality of transfer stations at at least some intersections of said multiple lines, wherein said territory is equipped with a plurality of parking structures, at least some of which are located at a distance from at least one of the plurality of transfer stations, said distance corresponding to a displacement by foot in a time of a same order as a transfer time required between two intersecting lines of the multiple lines, wherein each parking structure comprises a plurality of boxes for parking at least two of the plurality of available individual vehicles, said plurality of boxes forming at least two rows that provide a handling platform comprising a return area in front of a first row of the at least two rows and a pick-up area in front of a second row of the at least two rows, and wherein each parking structure further comprises a mechanism for an incremental displacement of said boxes in the at least two rows, said mechanism bringing at a level of the handling platform an empty box from the plurality of boxes in the first row and an occupied box from the plurality of boxes containing one of the plurality of available individual vehicles in the second row, wherein the one available individual vehicle is thereafter advanced on the pick-up area, and wherein, when the one individual vehicle is taken from a pick-up area of a first one of the plurality of parking structures, a second of the plurality of available individual vehicles is brought to the handling platform, and wherein, when the one individual vehicle is brought to a return area of a second one of the plurality of parking structures, said one individual vehicle is advanced and introduced in the empty box of the second parking structure at the level of the handling platform, wherein said empty box thereafter containing the one individual vehicle is raised by the mechanism and replaced by a second empty box ready to receive a further vehicle from the plurality of available individual vehicles, wherein each of the plurality of available vehicles is propelled by electricity given by batteries and each of the plurality of boxes is equipped with a means to recharge the vehicle batteries, the number of vehicles stored in each of the plurality of parking structures being based on the necessary time needed to recharge the batteries.

2. A system for collective transport of people according to claim 1, wherein the plurality of available vehicles stored in the plurality parking structures are available to a population of users of the public transportation network, each having their own personalized transportation title allowing to lock-unlock and start-up any one of the available vehicles and constituting an authorization to access any one of the parking structures.

3. A system for collective transport of people according to claim 2, wherein each personalized transportation title constitutes a means of payment, by its holder, for the use of a vehicle according to the distance travelled or the elapsed time.

4. A system for collective transport of people according to claim 3, wherein each transportation title comprises a smart card with a personal access code programmed to allow the holder, after code authorization, to perform operations necessary for taking charge of and returning a vehicle and for its payment of use.

5. A system for collective transport of people according to claim 4, wherein the transportation titles are smart cards serving as authorization to access the public transportation network, serving as authorization to access the parking structures and the available vehicles and serving as payment means for the use thereof.

6. A system for collective transport of people according to claim 2, wherein the access to a parking structure from the plurality of parking structures and the use of a vehicle therein is authorized by a system of central control accessible by cell phone or by internet service in order to obtain authorizations for its use.

7. A system for collective transport of people according to claim 1, wherein each parking structure is placed inside a building in the form of a tower having a lower section which is sunk into the ground to a variable depth which is determined so that the upper section that is above the ground extends to a height compatible with the site in which the parking structure is placed.

8. A system for collective transport of people according to claim 1, wherein the number of parking structures and the number of available vehicles contained in the boxes of each parking structure are determined according to an expected frequency of utilization.

9. A system for collective transport of people according to claim 1, wherein the territory is a urban district comprising a center surrounded by peripheral suburbs served by regional public transportation lines comprising a plurality of transit station stops each having one of the plurality of parking structures.

10. A system for collective transport of people according to claim 1, wherein those parts of the territory not served by the public transportation network are equipped with some of the plurality of parking structures distributed therethrough.

11. A system for collective transport of people according to claim 1, wherein the territory consists of at least two urban zones each equipped by a public transportation network with parking structures, the two zones being spaced apart at a distance compatible with the use of an autonomous vehicle in such a way as to permit transport by an autonomous vehicle either within one zone, or from one zone to another.

12. A system for collective transport of people according to claim 1, wherein the territory is equipped, around its center, with parking lots able to hold a large capacity of private vehicles, each placed in proximity to one of the plurality of stations of the public transportation network equipped with one of the plurality of parking structures, wherein after having parked ones vehicle in one of the parking lots, a user is able to take a public transportation line and is also alternatively able to take one of the plurality of available vehicles from the proximate one of the plurality of parking structures.

13. A system for collective transport of people according to claim 1, wherein the at least two rows are vertical parallel rows.

14. A system for collective transport of people according to claim 1, characterized by the fact that each of the plurality of parking structures is of the Noria type and comprise the plurality of boxes stacked over one another, each serving as a storage space for one of the plurality of available vehicles and being suspended from a chain drive, wherein each of the storage box is secured to the chain drive by a means of fixation allowing for the box to be suspended on a vertical axis, said chain drive being stretched between two spaced wheels, turning about two parallel horizontal axes in such a way as to control the displacement of the boxes vertically in the at least two rows passing respectively before the return area and the pick up area located on the handling platform placed at an intermediate level between the two rotating wheels, the rotation of the chain stopping at the moment the empty box of the first row or an occupied box of the second row containing the one available vehicle arrives at the level of the handling platform.

15. A system for collective transport of people according to claim 1, wherein a further available vehicle taken from any one of the plurality of parking structures can be returned to any other one of the plurality of parking structures.

* * * * *